(12) United States Patent
Cheng

(10) Patent No.: US 7,292,281 B2
(45) Date of Patent: Nov. 6, 2007

(54) MONITORING CAMERA WITH A FAR INFRARED CAPABILITY

(76) Inventor: Yi Jen Cheng, 9F, No. 21, Sec. 2, Chorngder 2 Rd., Taichung (TW)

( * ) Notice: Subject to any disclaimer, the term of this patent is extended or adjusted under 35 U.S.C. 154(b) by 758 days.

(21) Appl. No.: 10/747,112

(22) Filed: Dec. 30, 2003

(65) Prior Publication Data

US 2005/0146641 A1    Jul. 7, 2005

(51) Int. Cl.
*H04N 5/225*    (2006.01)
(52) U.S. Cl. .................. 348/373; 348/374; 348/375; 348/164
(58) Field of Classification Search .......... 348/373, 348/374, 375, 376, 65, 68, 370, 84, 85; 396/427, 396/535
See application file for complete search history.

(56) References Cited

U.S. PATENT DOCUMENTS 4,855,838 A * 8/1989 Jones et al. ................ 348/84
5,032,919 A * 7/1991 Randmae ................... 348/345
6,741,286 B2 * 5/2004 Meek et al. ................ 348/370
6,992,722 B2 * 1/2006 Jung .......................... 348/373

* cited by examiner

Primary Examiner—Ngoc-Yen Vu
Assistant Examiner—John Morehead
(74) Attorney, Agent, or Firm—Bacon & Thomas, PLLC

(57) ABSTRACT

A monitoring camera with a far infrared capability has a cylindrical body (10), a lens hood (20), a luminous body (30) with multiple far infrared light emitting diodes (LEDs) and a lens cover (40). The lens hood (20) is a hollow cylinder and is divided into an inner segment and an enlarged outer segment (23) communicating with the inner segment. The enlarged outer portion (23) provides an enlarged compartment to hold a larger luminous body (30), which can hold more far infrared LEDs so the monitoring camera can see object at greater visual distances. Additionally, the field of vision the monitoring camera is also greater.

13 Claims, 6 Drawing Sheets

MONITORING CAMERA WITH A FAR INFRARED CAPABILITY

BACKGROUND OF THE INVENTION

1. Field of the Invention

The present invention relates to a monitoring camera, and more particularly to a monitoring camera with a far infrared capability that has an enlarged field of view and increased visual distance.

2. Description of Related Art

Often, monitoring cameras are mounted in a fixed position at a high place in or on buildings or street corners to provide recordings of a specific location for security purposes or to document accidents. Monitoring cameras used in dark locations usually have a far infrared capability. With reference to FIGS. 5 and 6, a conventional monitoring camera with a far infrared capability comprises a cylindrical body (60), a lens cover (80) and a luminous body (70).

The cylindrical body (60) is hollow and has a longitudinal axis (not numbered), a front end (62) and a telephoto lens (61). The front end (62) has a threaded outer periphery and an inner periphery with an shallow dent (63). The telephoto lens (61) is circular and is attached to the front end (62) concentrically at the longitudinal axis.

The luminous body (70) has an annular circuit board (71) and multiple far infrared light emitting diodes (LEDs) (72). The annular circuit board (71) has a front surface (not numbered) and a rear surface (not shown) and is mounted in the shallow dent (63) of the cylindrical body (60). The LEDs (72) are mounted on the front surface of the annular circuit board (71).

The lens cover (80) has a threaded inner periphery (not numbered) and screws onto the outer threaded periphery of the cylindrical body (60) to enclose the luminous body (70) between the lens cover (80) and the cylindrical body (60) and to protect the telephoto lens (61).

However, the conventional monitoring camera has the following disadvantages.

1. The cylindrical body (60) and the lens cover (80) have the same diameter, and the number of the far infrared LEDs (72) mounted on the annular circuit board (71) is limited by the diameter of the cylindrical body (60). Therefore, the visual distance of the monitoring camera is limited by the intensity of the limited number of LEDs (72).

2. The lens cover (80) has the same diameter as the cylindrical body (60), which limits the aperture of the lens cover (80). Therefore, the monitoring camera has a limited field of view because the aperture of the lens cover (80) cannot be increased to provide more space for the telephoto lens (61).

3. The lens cover (80) has a long threaded inner periphery to directly mount the lens cover (80) on the cylindrical body (60) and enclose the luminous body (70) between the cylindrical body (60) and the lens cover (80). Therefore, the lens cover (80) is troublesome to detach from the cylindrical body (60) and easy bumps inadvertently against the LEDs (72) when being detached.

The present invention has arisen to mitigate or obviate the disadvantages of the conventional monitoring camera with far infrared.

SUMMARY OF THE INVENTION

The objective of the present invention is to provide a monitoring camera that has an enlarged field of view and greater visual distance.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
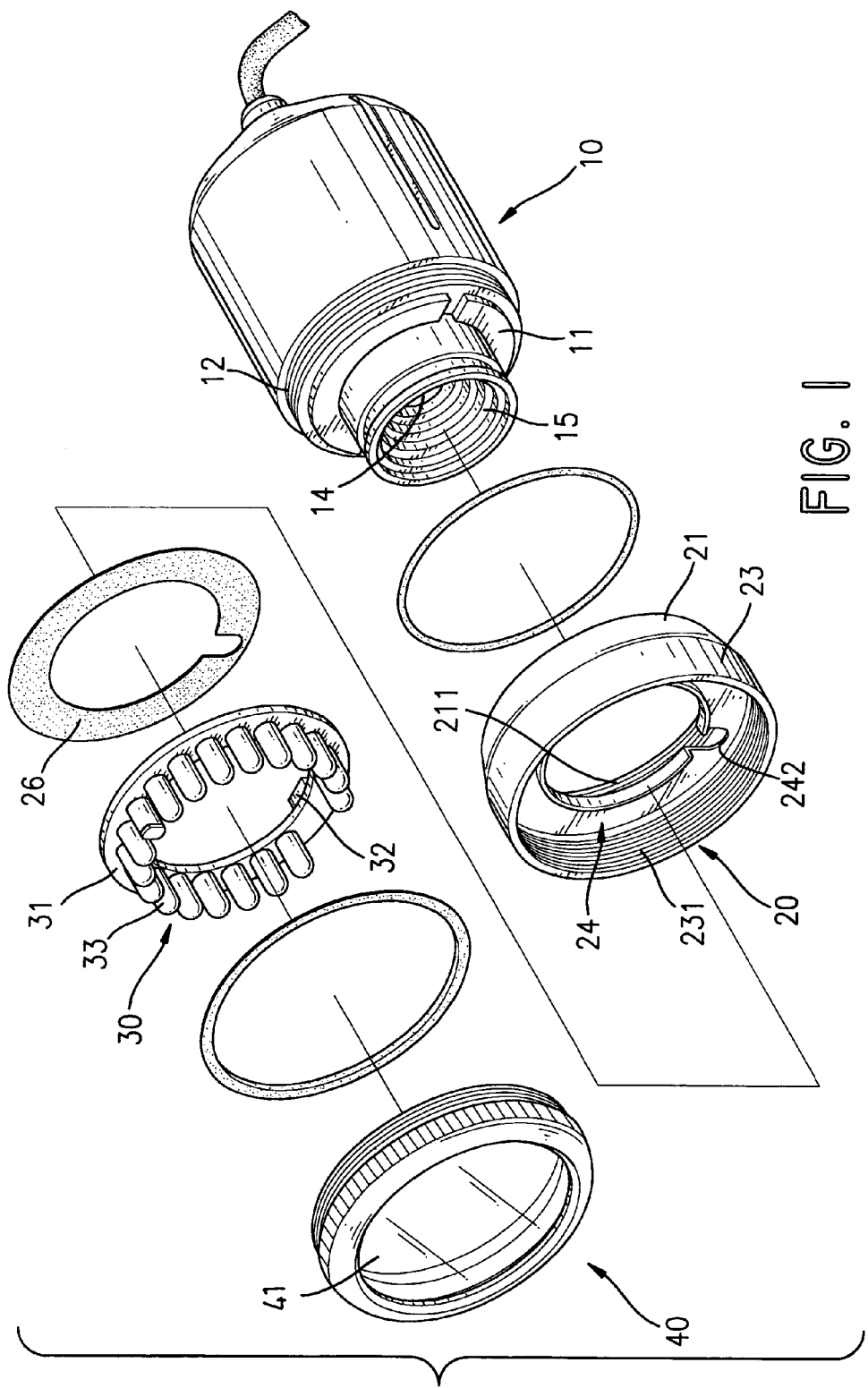
FIG. 1 is an exploded perspective view of a monitoring camera in accordance with the present invention.
Figure 2:
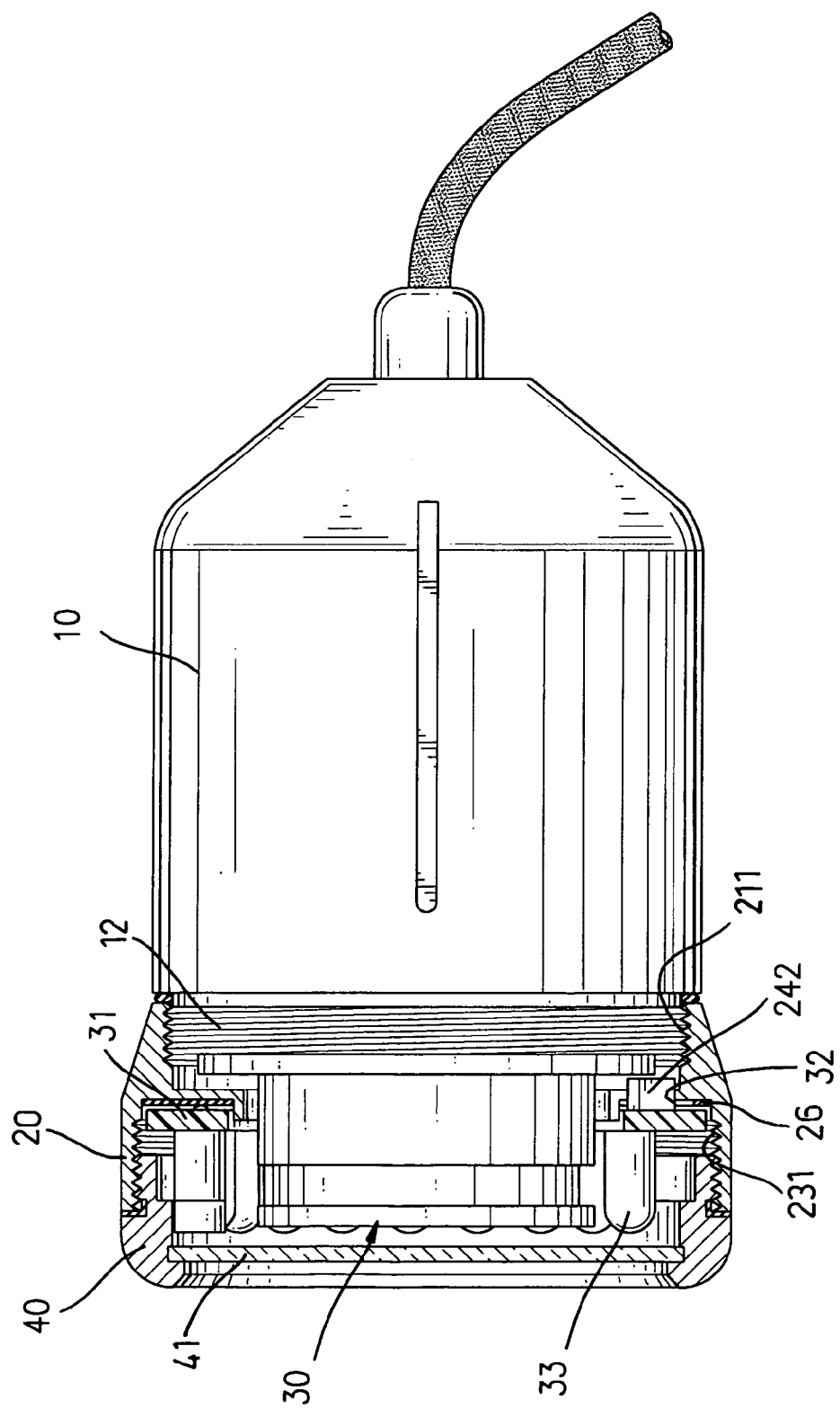
FIG. 2 is a side plane view in partial section of the monitoring camera in FIG. 1.
Figure 4:
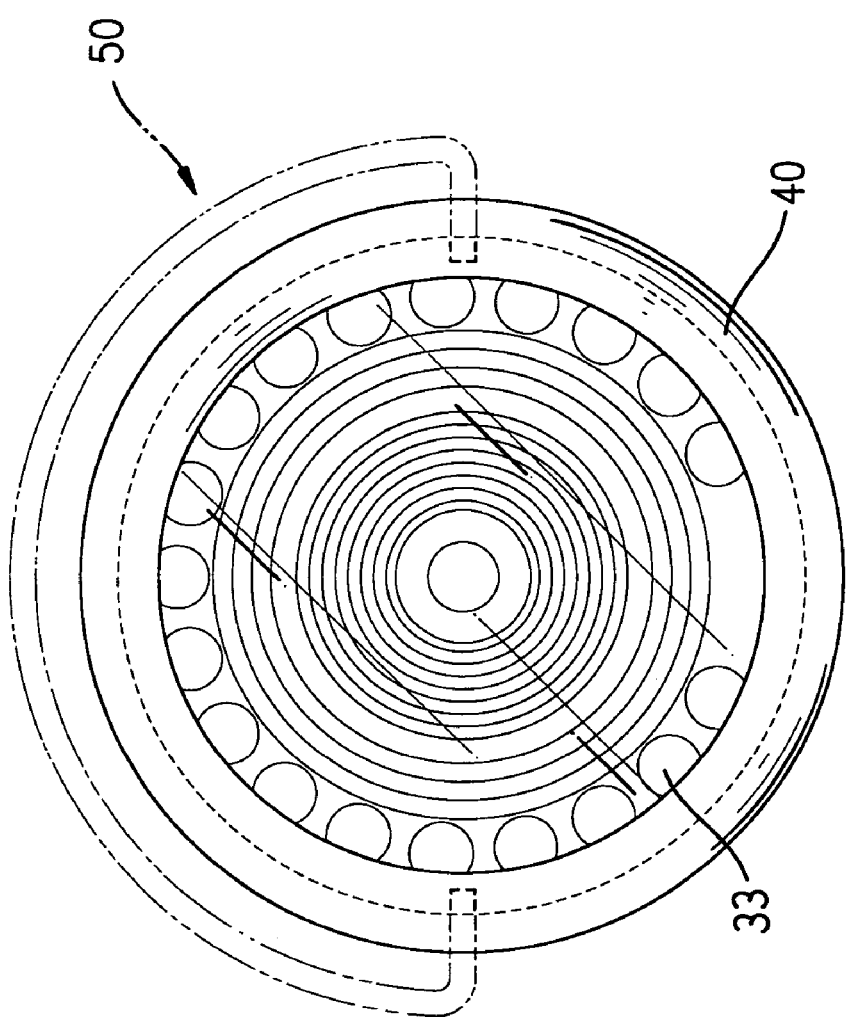
FIG. 4 is a front plane view of the monitoring camera in FIG. 3 with a top cover mounted on the monitoring camera.
Figure 5:
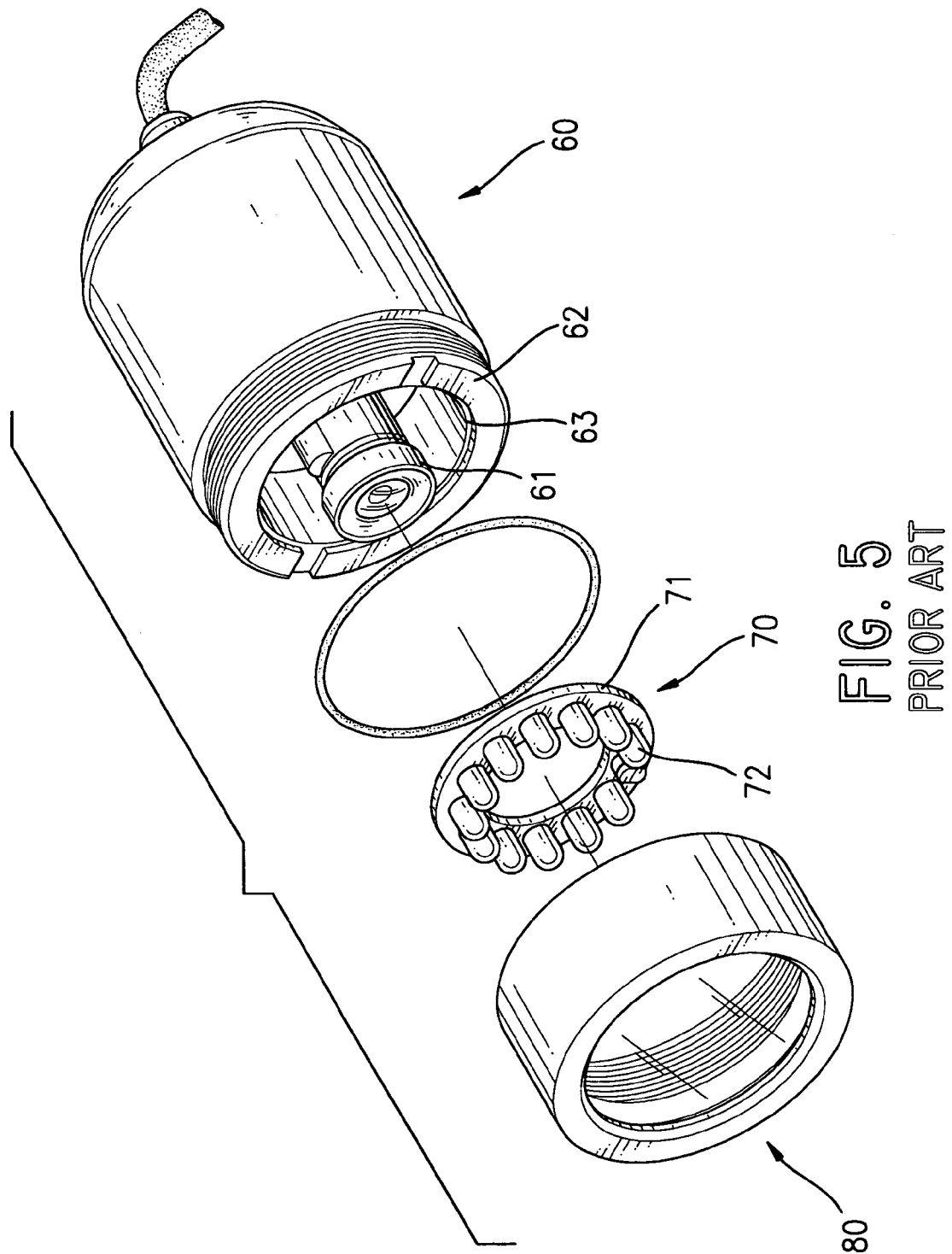
FIG. 5 is an exploded perspective view of a conventional monitoring camera in accordance with prior art.
Figure 6:
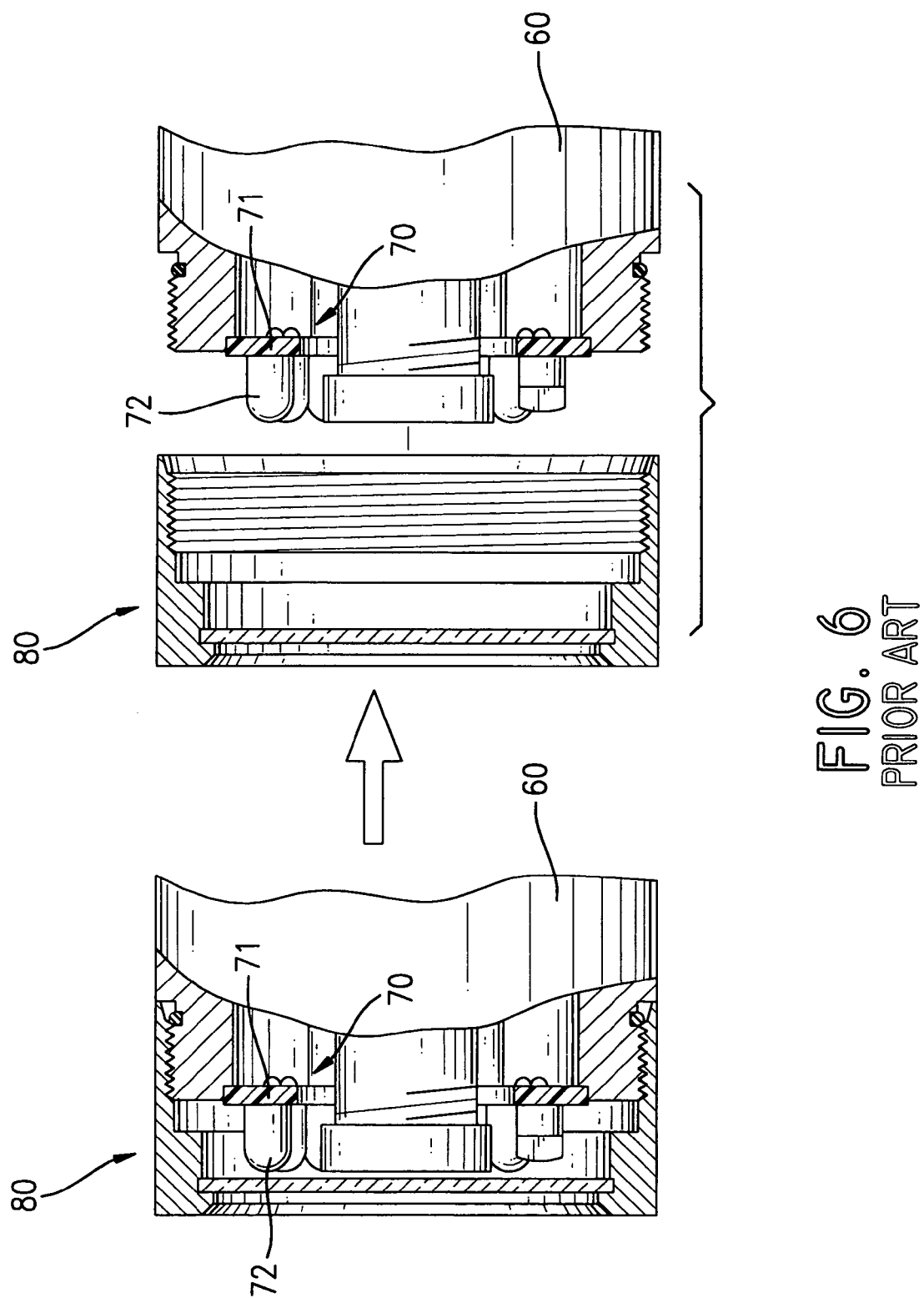
FIG. 6 is an operational side plane view in partial section of the conventional monitoring camera in FIG. 5.

With reference to FIGS. 1, 2 and 4, a monitoring camera with a far infrared capability in accordance with the present invention comprises a cylindrical body (10), a lens hood (20), a luminous body (30), a lens cover (40), an optional O-ring (not numbered), an optional gasket (26), an optional resilient washer (not numbered) and an optional hood (50).

The cylindrical body (10) is hollow and has a longitudinal axis, a front end (11), a funnel-channel rim (15) and a telephoto lens (14). The front end (11) has an outer threaded periphery (12). The funnel-channel rim (15) is attached to the front end (11) in front of the telephoto lens (14).

The lens hood (20) is a hollow cylinder and has an inner periphery (not numbered), an inner segment (21), an outer segment (23) and an inner flange (24).

The inner segment (21) has a constant inner diameter (not numbered), a tapered outer surface (not numbered) and a threaded inner periphery (211). The threaded inner periphery (211) screws onto the outer threaded periphery (12) of the cylindrical body (10) to attach the lens hood (20) to the cylindrical body (10).

The outer segment (23) has a constant outer diameter (not numbered), a constant inner diameter (not numbered) and an inner threaded periphery (231). The inner threaded periphery (231) is significantly larger than the inner threaded periphery (211) of the inner segment (21).

The optional O-ring is mounted between the lens hood (20) and the cylindrical body (10) and provides a watertight seal.

The inner flange (24) is formed on the inner periphery of the lens hood (20) between the inner segment (21) and the outer segment (23), extends radially inward and has a through hole (not numbered), a front surface (not numbered), a rear surface (not shown) and a U-shaped notch (242). The funnel-channel rim (15) passes through the through hole, and the U-shaped notch (242) communicates with the through hole.

The luminous body (30) is mounted inside the outer segment (23) of the lens hood (20) and has an annular circuit board (31) and multiple far infrared light emitting diodes, (LEDs) (33). The annular circuit board (31) has a front face (not numbered), a rear face (not numbered) and an optional limit block (32). The far infrared LEDs (33) are mounted on the front face of the annular circuit board (31). When the luminous body (30) is mounted in the lens hood (20), the annular circuit board (31) is electrically connected to a controlling switch (not shown) built inside the cylindrical body (10) to control the LEDs to emit far infrared light. Optionally, the limiting block (32) is formed on the rear face of the annular circuit board (31) to correspondingly engage the U-shaped notch (242) in the inner flange (24) to prevent the annular circuit board (31) from rotating.

The optional gasket (26) may be mounted between the rear face of the annular circuit board (31) and the front face of the inner flange (24).

The lens cover (40) detachably mounted in the outer segment (23) of the lens hood (20) is an annular cylinder having a front end (not numbered), a rear threaded end (not numbered) and a clear filter (41). The rear threaded end screws into the inner threaded periphery (231) of the lens hood (20) and abuts the front face of the annular circuit board (31) to hold the luminous body (30) in the monitoring camera. The clear filter (41) has a front surface (not numbered) and an optional transparent membrane (not shown). Preferably, the optional transparent membrane is bonded to the front surface of the clear filter (41) to reduce reflection and to protect the clear filter (41).

The optional resilient washer is mounted between the lens cover (40) and the front face of the annular circuit board (31) to provide a watertight seal.

Figure 3:
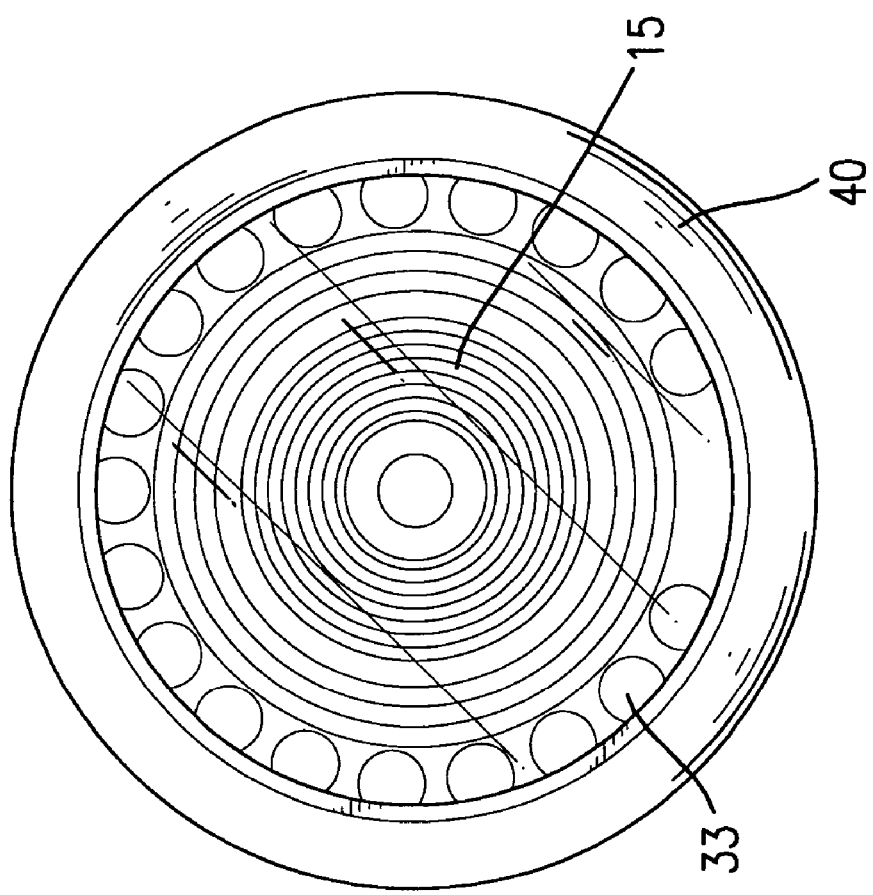
FIG. 3 is a front plane view of the monitoring camera in FIG. 2.

With reference to FIGS. 2 and 3, the outer segment (23) of the lens hood (20) is larger than the cylindrical body (10), which makes the annular circuit board (31) larger than the conventional annular circuit board. Therefore, more far infrared LEDs (33) can be mounted on the annular circuit board (31), the luminous body (30) provides more far infrared lighting, and objects are visible at farther distances in comparison with a conventional camera having the same size cylindrical body.

Additionally, the lens cover (40) and the transparent filter (41) provide a larger aperture than the conventional camera, which gives the monitoring camera a broader field of view.

With reference to FIG. 4, the optional hood (50) is mounted on the front end (11) of the monitoring camera to protect the telephoto lens (14) and the LEDs (33).

When the LEDs (33) malfunction and need to be replaced, the lens cover (40) is easily detached from the lens hood (20). The threaded rear end of the lens cover (40) is preferably short to allow the lens cover (40) to be removed quickly.

When the telephoto lens (14) needs to be cleaned, the lens hood (20) containing the luminous body (30) can be detached from the cylindrical body (10) without having to remove the luminous body (30) separately.

Although the invention has been explained in relation to its preferred embodiments, many other possible modifications and variations can be made without departing from the spirit and scope of the invention as hereinafter claimed.

What is claimed is:

1. A monitoring camera with a far infrared capability comprising:
    a cylindrical body having a longitudinal axis; a front end having an outer threaded periphery; a telephoto lens; and a funnel-channel rim mounted co-axially on the front end in front of the telephoto lens at the longitudinal axis;
    a lens hood detachably mounted on the cylindrical body, being a hollow cylinder and having an inner periphery; an inner segment having a constant inner diameter, a tapered outer surface and a threaded inner periphery that screws onto the outer threaded periphery of the cylindrical body;
    an outer segment having a constant outer diameter, a constant inner diameter and an inner threaded periphery larger than the inner threaded periphery of the inner segment; and
    an inner flange formed on the inner periphery of the lens hood between the inner segment and the outer segment, that extends radially inward and has a through hole through which the funnel-channel rim passes;
    a luminous body mounted inside the outer segment of the lens hood and comprising an annular circuit board with a front face and a rear face; and multiple far infrared light emitting diodes (LEDs) mounted on the front face of the annular circuit board (31); and
    a lens cover being an annular cylinder, detachably mounted in the outer segment of the lens hood and having a front end; a rear threaded end that screws into the inner threaded periphery of the lens hood and abuts the front face of the annular circuit board to hold the luminous body in the monitoring camera; and
    a clear filter having a front surface.

2. The monitoring camera as claimed in claim 1, wherein the inner flange has a U-shaped notch communicating with the through hole; and the annular circuit board has a limiting block formed on the rear face of the annular circuit board to engage the notch.

3. The monitoring camera as claimed in claim 2, wherein a gasket is mounted between the inner flange and the annular circuit board of the luminous body.

4. The monitoring camera as claimed in claim 3, wherein a resilient washer is mounted between the lens cover and the front face of the annular circuit board to provide a watertight seal.

5. The monitoring camera as claimed in claim 4, wherein the clear filter has a transparent membrane bonded to the front surface of the clear filter to reduce reflection and to protect the clear filter.

6. The monitoring camera as claimed in claim 5 further having a hood mounted on the front end of the monitoring camera to protect the telephoto lens and LEDs.

7. The monitoring camera as claimed in claim 2, wherein an O-ring is mounted between the lens hood and the cylindrical body to provide a watertight seal.

8. The monitoring camera as claimed in claim 2, wherein a resilient washer is mounted between the lens cover and the front face of the annular circuit board to provide a watertight seal.

9. The monitoring camera as claimed in claim 1, wherein a gasket is mounted between the inner flange and the annular circuit board of the luminous body.

10. The monitoring camera as claimed in claim 9, wherein an O-ring is mounted between the lens hood and the cylindrical body to provide a watertight seal.

11. The monitoring camera as claimed in claim 9, wherein a resilient washer is mounted between the lens cover and the front face of the annular circuit board to provide a watertight seal.

12. The monitoring camera as claimed in claim 1, wherein an O-ring is mounted between the lens hood and the cylindrical body to provide a watertight seal.

13. The monitoring camera as claimed in claim 1, wherein a resilient washer is mounted between the lens cover and the front face of the annular circuit board to provide a watertight seal.

* * * * *